April 11, 1972 — H. BADER ET AL — 3,655,764
CONTINUOUS PROCESS FOR MAKING HYDROXYLAMINES
Filed Feb. 24, 1969
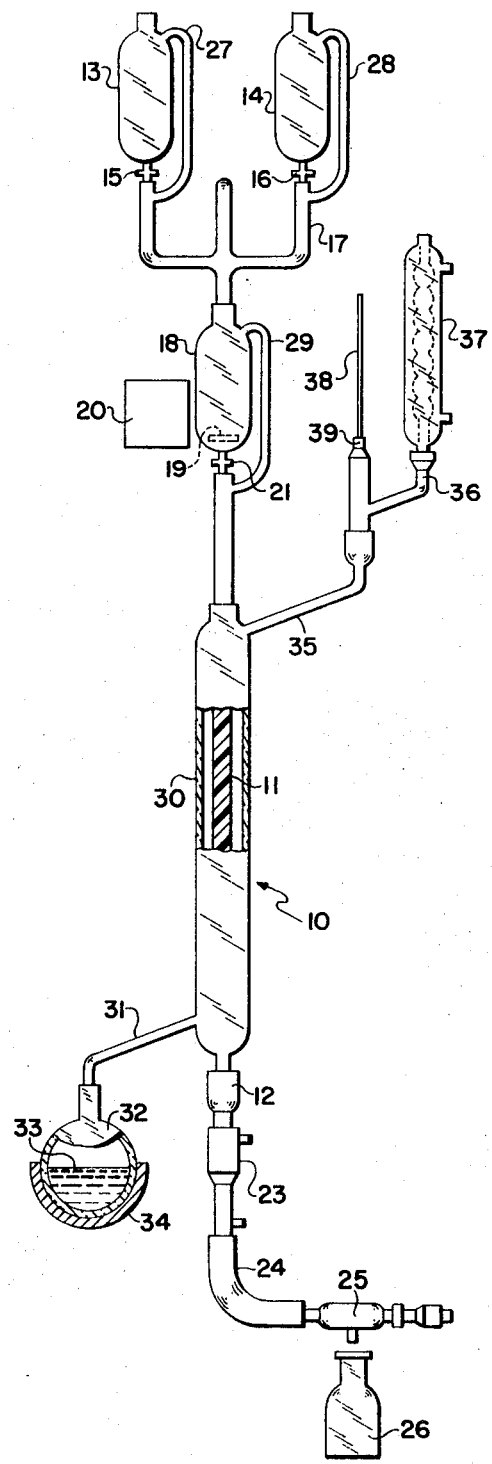
INVENTORS
HENRY BADER
and
ALEXANDER BOAG
BY
Brown and Mikulka
ATTORNEYS _United States Patent Office_ 3,655,764
Patented Apr. 11, 1972

3,655,764
CONTINUOUS PROCESS FOR MAKING HYDROXYLAMINES
Henry Bader, Newton Center, and Alexander Boag, Arlington, Mass., assignors to Polaroid Corporation, Cambridge, Mass.
Filed Feb. 24, 1969, Ser. No. 801,550
Int. Cl. C07c *83/02, 83/04*
U.S. Cl. 260—584 C    10 Claims

ABSTRACT OF THE DISCLOSURE

N,N-disubstituted hydroxylamines are prepared in improved yields by continuously and progressively reacting the corresponding secondary amine with an inorganic peroxide at elevated temperatures and continuously quenching the reaction as the peroxide becomes consumed by rapidly cooling the reaction mixture to below about 25° C.

---

This invention relates to an improved process of preparing N,N-disubstituted hydroxylamines by oxidation of the corresponding secondary amines with an inorganic peroxide. More particularly, this invention is concerned with effecting such oxidation by continuous and progressive reaction.

Copending application Ser. No. 652,714, of Henry Bader and Sheldon Buckler, filed July 12, 1967, now U.S. Pat. No. 3,467,711 issued Sept. 16, 1969, discloses and claims the beneficial use of a metal sequestering agent such as ethylenediaminetetraacetic acid in the oxidation of secondary amines to hydroxylamines using inorganic peroxides. This application also discloses the benefits derived from conducting the reaction at relatively high temperatures of 50° to 100° C. and carrying out the oxidation in the absence of a catalyst, e.g., sodium tungstate, as commonly used for accelerating oxidation reactions of this type. In particular, the method of the aforementioned application makes it possible to obtain hydroxylamines of good quality in excellent yields and to recover unreacted starting amine in substantial quantities for re-use.

While the above process is very satisfactory for small batch operations, it has been found in practice that such a reaction cannot be conveniently carried out on a commercial scale. Large production batches require, due to the evolution of heat, an excessively long time for adding the peroxide to the starting amine. Such long addition times, together with the extended times required to cool large batches of material, give rise to decomposition and side reactions resulting in reduced yields and undesirable color formation in the product.

It is therefore the primary object of the present invention to provide an improved method of preparing N,N-disubstituted hydroxylamines that may be carried out on a commercial scale to give a product of acceptable color and excellent quality in high yields.

It is another object of the present invention to provide a process of synthesizing such hydroxylamines whereby the corresponding secondary amine and an inorganic peroxide are continuously and progressively reacted under conditions such that a hydroxylamine product of uniformly high quality is continuously produced and recovered.

A further object of the present invention is to provide N,N-disubstituted hydroxylamines suitable for use in developing compositions employed in diffusion transfer photographic processes.

The invention accordingly comprises the several steps and the relation and order of one or more of such steps with respect to each of the others, and the compositions possessing the features, properties and the relation of elements which are exemplified in the following disclosure, and the scope of the application of which will be indicated in the claims.

According to the present invention, it has now been discovered that N,N-disubstituted hydroxylamines may be produced on a large scale without any significant amount of degradation or discoloration by continuously and progressively introducing a secondary amine, a metal sequestering agent and an inorganic peroxide to a heated reaction zone and continuously withdrawing the mixture from the zone as the peroxide is consumed provided that the effluent issuing from the reaction zone is rapidly cooled to a temperature not exceeding about 25° C.

By means of the process embodying this invention, the desired hydroxylamine is formed in high yields without the necessity for heating and cooling large volumes of reactants and without requiring the use of extensive, large-capacity equipment. Due to high throughput rates, the reaction may be carried out using simple apparatus of low capacity without any sacrifice in yield per unit of time. Since the reaction conditions may be more easily controlled in the continuous reaction than from batch to batch and since the reaction time for any increment of reaction mixture is a few minutes as compared to as much as several hours for corresponding batch reactions, the formation of undesirable color is minimized and overall product quality is more uniform.

For a fuller understanding of the nature and objects of the invention, reference should be had to the following detailed description taken with reference to the apparatus illustrated in the single figure of the drawing.

The single figure is a view in elevation, partly in section, of a continuous reactor particularly useful for effecting the continuous oxidation reaction of the present invention.

The present invention is applicable to N,N-disubstituted hydroxylamines corresponding to the formula:

wherein each of $R^1$ and $R^2$ are independently selected from the group consisting of alkyl, cycloalkyl, alkoxyalkyl, aralkyl, alkoxyalkoxyalkyl, and an alkenyl radical and $R^1$ and $R^2$ when taken together represent the atoms necessary to complete a heterocyclic ring selected from piperidyl, pyrrolidyl and N-alkylpiperazinyl. For photographic use, the alkyl, alkoxyalkyl and alkenyl radicals preferably contain from 1 to 3 carbon atoms, but may contain more carbon atoms provided the resulting compound is soluble in water.

Typical amines that can be oxidized to form N,N-disubstituted hydroxylamines include di-ethylamine, di-n-propylamine, di-s-propylamine, di-n-butylamine, di-t-butylamine, N-ethyl-N-cyclohexylamine, N-ethyl-N-benzyl amine, N-ethyl-N-2-methoxyethylamine, di-ethoxyethoxyethylamine, di-propenylamine, piperidine, pyrrolidine, N-methylpiperazine, etc.

The preferred alkoxyalkyl hydroxylamines that can be prepared by this continuous process include:

(1)  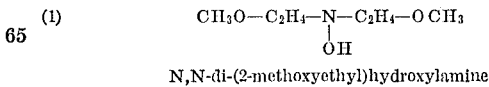
N,N-di-(2-methoxyethyl)hydroxylamine

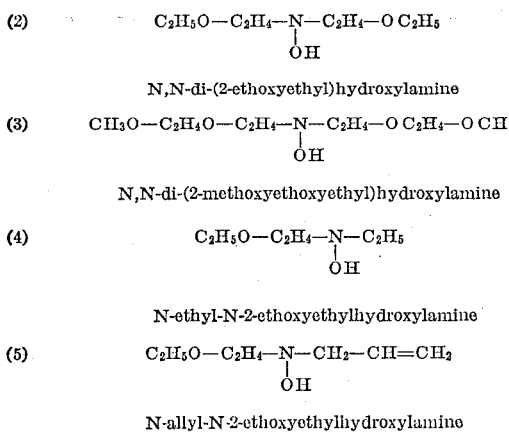

(2) N,N-di-(2-ethoxyethyl)hydroxylamine (3) N,N-di-(2-methoxyethoxyethyl)hydroxylamine (4) N-ethyl-N-2-ethoxyethylhydroxylamine (5) N-allyl-N-2-ethoxyethylhydroxylamine In carrying out the process of the present invention, any inorganic peroxide may be employed such as hydrogen peroxide or an alkali metal peroxide, e.g., sodium or potassium peroxide. For convenience and economy and other reasons, however, the use of hydrogen peroxide is preferred.

As discussed in the aforementioned copending application, it is believed that the degradation of the hydroxylamine product proceeds mainly via a free radical mechanism in the presence of the peroxide. This degradative oxidation is believed to be catalyzed by trace metals such as copper and iron commonly found in water, solvents and the reaction equipment. It has been found that a metal sequestering agent is useful in retarding this degradation reaction not only in the batch process of the aforementioned copending application but also in the continuous process of the present invention. For example, it has been found that high yields of 47% of N,N-di-(2-methoxyethyl)hydroxylamine can be obtained with very good reproducibility when the continuous process of the present invention is carried out in the presence of ethylenediaminetetraacetic acid (EDTA). In contrast, a yield of only 28.2% of this hydroxylamine was obtained when the continuous reaction was conducted in the absence of EDTA.

For this purpose, any metal sequestering agent is useful, patricularly those that are very effective in combining with metallic ions of the heavy metals, i.e., metals having a specific gravity above about 4. Commonly used metal sequestering agents that may be employed in the present process include phosphates, aminopolycarboxylic acids and hydroxycarboxylic acids. Examples of specific sequestering agents are sodium metaphosphates, N,N,N',N'-tetrahydroxyethylethylenediamine, ethylenediaminetetraacetic acid, aminotriacetic acid, sodium diethyldithiocarbamate, salicylaldoxime, and gluconic, citric and tartaric acids. Such materials, though retarding over-oxidation of the hydroxylamine product, allow the continuous conversion of amine to hydroxylamine in the present process to proceed unaffected.

As also discussed in the above copending application, certain materials have been used as oxidation accelerators or catalysts which allow the oxidation of the amine to the hydroxylamine to proceed at comparatively low temperatures. Commonly used oxidation accelerators are the oxides, oxygen acids and alkali metal salts of oxygen acids of tungsten, molybdenum, vanadium, selenium and uranium. The accelerators most frequently used are the tungstates, particularly sodium tungstate.

Because of the reduction in product yields observed in batch reactions employing these accelerators, it is believed that, besides catalyzing the desired oxidation of secondary amine, they also catalyze the degradative oxidation of the hydroxylamine product. For example, in the batch reactions compared in copending application Ser. No. 652,714, it was found that only 8% yield of hydroxylamine product was obtained when an accelerator was used with the sequestering agent and peroxide whereas 30% yield of hydroxylamine was obtained when the oxidation accelerator was omitted. While these catalytic materials may be used in the continuous process of the present invention to initiate oxidation of amine at lower temperatures without causing such a substantial drop of hydroxylamine yield, the continuous oxidation reaction is preferably conducted at relatively high temperatures in the absence of an oxidation accelerator to ensure consistently good results.

Also, the continuous oxidation reaction of the present invention preferably is carried out in aqueous solution. The amount of water in the reaction mixture, which serves to moderate the exothermic reaction, may vary widely but usually ranges between about 50% and 70% by weight of the total solution. The amount of water in the reaction mixture should be adjusted in relation to another variable of the system, the temperature of the external jacket of the reactor, which may serve either to provide additional heat or to dissipate heat. At low jacket temperatures, with more than 70% water, the reaction mixture is too dilute and requires a long residence time, which results in poor product color and poor yields. Similar results are observed at high jacket temperatures when less than 50% water is present. In the more concentrated solution the reaction tends to be too exothermic.

The concentrations of reactants and metal sequestering agent likewise may vary widely depending upon the external jacket temperature. Using high temperatures, the ratio of inorganic peroxide to secondary amine generally ranges between about 0.75 and 1.50 moles of peroxide per mole of amine and preferably between 0.9 and 1.25 moles peroxide for each mole of amine. With the lesser amounts of peroxide, low conversions are obtained even at relatively high jacket temperatures whereas excessive quantities of peroxide cause overoxidation of the product and furthermore induce too vigorous a reaction which also leads to poor yields and undesirable brown color in the product.

While as little as 0.001 mole of metal sequestering agent per mole of amine is effective, as much as 1 mole may be added, if desired. The preferred operating range is between about 0.005:1 and 0.001:1 sequestering agent to amine.

While the various independent reaction variables are manipulated, the successful combinations of these variables result in a moderately exothermic reaction with a reaction temperature close to 103° C. One of the variables to be adjusted, as mentioned above, is the temperature of the external jacket of the reactor.

As indicated above, the continuous oxidation reaction may be conducted at low jacket temperatures but is usually carried out at a jacket temperature ranging between about 60° and 150° C. and preferably, between about 75° and 105° C. At these high temperatures, rapid initiation of the reaction is assured and once established, the hydroxylamine product is formed continuously at a satisfactorily steady rate. By using high jacket temperatures and maintaining the proportions of materials in the reaction mixture within certain limits, optimum results are achieved whereby the hydroxylamine product is produced in very high yields and has the desired pale color.

Since the hydroxylamine product is unstable in air at high temperatures and tends to discolor due to oxidation, the effluent emerging from the heated reaction zone should be cooled. Since it is desirable to quench the oxidation reaction and stabilize the product as quickly as possible, the effluent is rapidly cooled to a temperature not exceeding about 25° C.

In general, the continuous oxidation reaction of the invention is effected by progressively and simultaneously introducing the secondary amine, inorganic peroxide and metal sequestering agent into a heated reaction zone, continuously reacting the resulting mixture while simultaneously flowing the mixture through the reaction zone away from the point of introduction of the reactants into said zone, quenching the reaction by cooling the effluent issuing from said reaction zone, and continuously and progressively withdrawing the hydroxylamine product.

A simple but highly effective method for effecting the process involves merely passing the reaction mixture downwardly through a heated packed column such as is well known in the art. The column may be any size depending upon the desired rate of production. Ordinarily, the column is of the usual kind containing packing material such as glass beads, glass helices, Beryl saddles or similar inert packing material. The particular packing material used is not critical, its purpose being mainly that of effecting better heat exchange and mixing. In large scale equipment the packing may be dispensed with altogether, so long as the free-space is adjusted appropriately. The column may be heated using any convenient means. Commonly, the column is provided with external heating means comprising a jacket which may be heated by steam or in some other manner such as by circulating a heated liquid therethrough. Suitable feed means are provided for progressively introducing the reactants into the upper portion of the column and suitable means are provided for continuously withdrawing the product at a controlled rate after the effluent from the heated column has been passed through a condenser or other appropriate cooling means.

The reactants may be introduced to the column separately or in a premixture. For convenience, an aqueous solution of the peroxide and an aqueous solution comprising the secondary amine and metal sequestering agent are continuously or intermittently fed to an unheated premixing reservoir from which the resulting reaction mixture is continuously introduced to the column. The reactants may be introduced originally at a somewhat faster rate than that used throughout the run (see below), up to the point at which the column would become filled.

The rate at which the reactants are introduced is, of course, correlated with the rate at which the product is withdrawn so that when a heated column is used, the level of the reaction mixture is maintained substantially constant. In correlating the relative rates of introduction and withdrawal, they are adjusted so that the reaction mixture flows from the reactor just as the inorganic peroxide in the reaction mixture becomes consumed. These rates which control the residence time in the reaction zone may be readily determined for a given set of reaction conditions, i.e., ratio of reactants, proportion of water in the reaction mixture, jacket temperature, dimensions of the reaction zone and so forth. Once the reaction has been established by correlating the various conditions for optimum results, the process may be run continuously for prolonged periods without significant change in the product and without the necessity of any further manipulative steps.

One apparatus comprising a heated reaction column useful in conducting the continuous process of the present invention is illustrated in the drawing. Referring particularly to the drawing, the reaction column designated 10 consists of a packed, heated upper portion 11 and an unpacked, unheated lower portion 12. The column 10 may be constructed of glass or inert metal. The upper portion 11, which may be filled with glass beads or other appropriate inert packing, is heated by means of jacket 30.

Jacket 30 is connected by means of tube 31 to reservoir 32 which contains an organic solvent 33 of appropriate boiling point that is maintained at reflux by a suitable heater 34. The solvent vapor passes through jacket 30, then through conduit 35 and adapter 36 to be cooled in a water-cooled condenser 37 whereby the condensate returns by gravity to reservoir 32. The temperature of the solvent vapor is measured by thermometer 38 which is positioned in adapter 36 by means of a second adapter 39. Jacket 30 also may be heated by steam which is admitted through conduit 35 and discharged through tube 31 to a drain.

The two reaction solutions comprising an aqueous solution of inorganic peroxide and an aqueous solution of secondary amine and metal sequestering agent are stored in unheated reservoirs 13 and 14, which are connected to an unheated premixing reservoir 18 by a multiple outlet adapter 17. Stopcocks 15 and 16 permit introduction of the reaction solutions either intermittently or continuously at a controlled rate to the premixing reservoir 18. The two reaction solutions are mixed in reservoir 18 by means of a Teflon-coated bar magnet 19, which is driven by vertically mounted magnetic stirrer 20.

The mixed solutions comprising the reaction mixture are introduced continuously at a controlled rate from reservoir 18 by means of stopcock 21. The reaction mixture passes into the packed, heated upper portion 11 of column 10 at a rate such that the level of reaction mixture in the column is maintained level with the top of the packing.

The reaction mixture flows through the system by gravity from reaction column 10 through a water-cooled condenser 23 which serves to cool the effluent issuing from the column thereby quenching the reaction. The cooled effluent then flows through conduit 24 into collection reservoir 26. Conduit 24 is fitted with valve 25 which permits withdrawal of the product at a controlled rate.

The entire reaction system is vented by means of pressure-equalizing side arms 27, 28 and 29 on reservoirs 13, 14 and 18, respectively.

The apparatus as described above constitutes only one way of carrying out the continuous process of the present invention. Alternatively, the reactants or reaction mixture may be fed through a pump at the base of the heated column so that the reactant stream flows upwardly through the column. In this instance the rate of flow will be controlled by the pump. Other types of apparatus also may be employed. For example, one can devise a continuously stirred flask or other vessel with appropriately situated addition and exit side-arms.

The present invention will be further illustrated by, but is not intended to be limited to, the following examples.

EXAMPLE 1

N,N-di-(2-methoxyethyl)hydroxylamine was prepared by the continuous process described using apparatus such as is illustrated in the drawing. The column used had an upper portion 61 cm. long packed with 0.5 mm. glass beads, with a free volume of 65 ml., and an unpacked lower portion 9 cm. long with a volume of 15 ml.

A solution containing 815 g. (6.0 moles) of 98% di-(2-methoxyethyl)amine, 1.75 g. (0.006 mole) of EDTA, and 423 ml. of distilled water (total volume 1275 ml.) was added to reservoir 13 in 250 ml. portions.

A second solution containing 657 g. (590 ml.) of 31.0% hydrogen peroxide (6.0 moles) and 685 ml. of distilled water (total volume 1275 ml.) was added in 250 ml. portions to reservoir 14.

The two solutions were premixed in reservoir 18 in 25 ml. lots of each solution using the magnetic stirring assembly 19, 20 and the premixed solution was continuously added to column 10. The level of the reaction mixture in the column was maintained at the top of the glass beads packed in upper portion 11 by means of stopcock 21. Upper portion 11 of the column was heated by refluxing 2-bromobutane (boiling point 91° C.) in outer jacket 30.

The progress of the reaction was controlled by the rate of removal of effluent from the reaction column by valve 25. The rate of removal was adjusted so that the hydrogen peroxide had just been consumed by the time the reaction mixture issued from the reaction column as determined by an iodide-starch-acetic acid indicator solution. The effluent emerging from the column was cooled to quench the reaction by passing through condenser 23 and collected in reservoir 26.

After equilibrium of the reaction had been established, effluent was continuously withdrawn and collected over a period of about 3 hours and 30 minutes. The total collected weighed 2382 g. and had a volume of 2335 ml. giving an average rate of elution of 11.1 ml./min. and an average residence time of 7.2 min. in the column.

The reaction product, which was pale yellow in color, contained 16.3% by weight of N,N-di-(2-methoxyethyl) hydroxylamine representing a yield of 47.1% by weight and 8.7 by weight of di-(2-methoxyethyl)amine representing 38.1% by weight of unreacted starting amine.

EXAMPLE 2

Example 1 was repeated but with the following changes: (1) upper portion 11 of column 10 was heated by live steam passed through jacket 30 instead of refluxing 2-bromobutane, (2) the molar ratio of hydrogen peroxide to amine was changed from 1:1 to 1.15:1, and (3) the total dilution of both reactant solutions was adjusted to give a total water content of 70% when admixed instead of 60% as in Example 1.

The effluent withdrawn and collected from the reaction gave a yield of 46.7% by weight of N,N-di-(2-methoxyethyl)hydroxylamine and a 21.4% by weight recovery of starting amine.

EXAMPLE 3

Example 1 was repeated with the following changes: (1) refluxing 1,2-dichloroethane (boiling point 24° C.) was used as the refluxing solvent in jacket 30 instead of refluxing 2-bromobutane, (2) the molar ratio of hydrogen peroxide to amine was changed to 1.25:1, and (3) the water content of the reaction mixture comprising the mixed reactant solutions was 56.9% by weight.

An analysis of the effluent withdrawn and collected from the reaction gave a 46.1% by weight yield of N,N-di-(2-methoxyethyl)amine and 13.8% by weight of starting amine.

From the above examples, it will be readily apparent that N,N-di-substituted hydroxylamines may be produced in exceptionally high yields using the continuous process of the present invention and that the products obtained are free from the objectionable brown discoloration which tends to limit their usefulness in certain applications. The process of this invention has a further advantage in that it can be run continuously for prolonged periods of time with uniform results using relatively simple apparatus. Moreover, the process may be effected on a plant scale, e.g., to produce a hundred pounds per hour, without any significant change in yields or color.

As previously mentioned, the compounds prepared by the process of this invention are useful as developing agents in conventional or wet development of silver halide emulsions, diffusion transfer processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Pat. No. 3,293,034 to Milton Green et al.

In diffusion transfer processes of this type, as is well known in the art, an exposed silver halide emulsion is treated with a liquid processing composition while in superposed relationship with an image-receiving material. The liquid processing composition develops exposed silver halide to silver and reacts with unexposed silver halide to form a complex silver salt which is transferred to the image-receiving material and there reduced to silver to form a positive print. The processing composition includes a silver halide solvent, such as sodium thiosulfate, and may also contain a film-forming material for increasing the viscosity of the composition. As used herein, the term "silver halide solvent" refers to reagents which will form a soluble complex with silver halide, as is well known in the art of forming silver images by transfer.

Since certain changes may be made in the above compositions and processes without departing from the scope of the invention herein involved, it is intended that all matter contained in the above description shall be interpreted as illustrative and not in a limiting sense.

What is claimed is:

1. The method of preparing an N,N-disubstituted hydroxylamine from the corresponding secondary amine in a continuous manner which comprises:
  (a) progressively and simultaneously introducing a secondary amine, a metal sequestering agent and an inorganic peroxide to a heated reaction zone maintained at a temperature between about 60° C. and 150° C., said secondary amine having the formula:

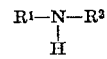

wherein each of $R^1$ and $R^2$ are independently selected from the group consisting of alkyl, cycloalkyl, alkoxyalkyl, aralkyl, alkoxyalkoxyalkyl, and an alkenyl radical,
  (b) continuously flowing the resulting mixture of reactants through the reaction zone away from the point of introduction of the reactants whereby hydroxylamine is progressively formed,
  (c) continuously withdrawing effluent from the reaction zone as the peroxide becomes consumed, while simultaneously cooling the effluent to quench the reaction, and
  (d) continuously and progressively collecting the cooled effluent comprising the N,N-disubstituted hydroxylamine.

2. The method according to claim 1 wherein said mixture of reactants is in aqueous solution.

3. The method according to claim 1 wherein an aqueous solution of secondary amine and a metal sequestering agent is introduced to the reaction zone progressively and simultaneously with a second aqueous solution of inorganic peroxide.

4. The method according to claim 3 wherein said aqueous solutions are premixed prior to introduction to the reaction zone.

5. The method according to claim 1 wherein the reaction is carried out in the absence of an oxidation catalyst.

6. The method according to claim 1 wherein the rate of introduction of reactants to the reaction zone is correlated with the rate of withdrawal of effluent from the reaction zone to maintain a substantially constant level of solution in the column.

7. The method according to claim 1 wherein the secondary amine is N,N-di-(2-methoxyethyl)amine.

8. The method according to claim 1 wherein the inorganic peroxide is hydrogen peroxide.

9. The method according to claim 1 wherein the sequestering agent is ethylenediaminetetraacetic acid.

10. In the method of forming an N,N-disubstituted hydroxylamine by reacting the corresponding secondary amine with an inorganic peroxide, the steps of effecting the reaction in a continuous manner:
  (a) by progressively introducing an aqueous solution of a secondary amine, an inorganic peroxide and a metal sequestering agent into the top of a reaction zone defined in a jacketed, packed column having a jacket temperature between about 60° C. and 150° C., said secondary amine having the formula:

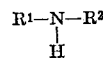

wherein each of $R^1$ and $R^2$ are independently selected from the group consisting of alkyl, cycloalkyl, alkoxyalkyl, aralkyl, alkoxyalkoxyalkyl, and an alkenyl radical, (b) continuously flowing the solution downwardly through the column, and
(c) as the peroxide becomes consumed, continuously withdrawing effluent from the bottom of the column directly into a condenser maintained at a temperature not exceeding about 25° C., and continuously and progressively collecting the cooled effluent comprising N,N-disubstituted hydroxylamine, said solution being introduced and said effluent being withdrawn at rates correlated to maintain a substantially constant level of solution in the column.

References Cited
UNITED STATES PATENTS 3,467,711  9/1969  Bader et al. _____ 260—583 DD JOSEPH REBOLD, Primary Examiner R. L. RAYMOND, Assistant Examiner U.S. Cl. X.R.

260—268 R, 293 R, 326.8, 563 R, 570.8, 570.9, 583 DD, 584 B